United States Patent
Ikeda

(10) Patent No.: US 12,003,681 B2
(45) Date of Patent: Jun. 4, 2024

(54) INFORMATION PROCESSING APPARATUS AND NON-TRANSITORY COMPUTER READABLE MEDIUM STORING PROGRAM FOR PERFORMING TO DISPLAY ELEMENTS REPRESENTING IN WORKFLOW AND INDICATING A BRANCH DESTINATION IN DETERMINING

(71) Applicant: FUJIFILM Business Innovation Corp., Tokyo (JP)

(72) Inventor: Soichiro Ikeda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 389 days.

(21) Appl. No.: 17/331,641

(22) Filed: May 27, 2021

(65) Prior Publication Data

US 2022/0191341 A1 Jun. 16, 2022

(30) Foreign Application Priority Data

Dec. 14, 2020 (JP) ................. 2020-206540

(51) Int. Cl.
*H04N 1/00* (2006.01)
*G06F 3/12* (2006.01)

(52) U.S. Cl.
CPC ....... *H04N 1/00949* (2013.01); *G06F 3/1204* (2013.01); *G06F 3/1275* (2013.01)

(58) Field of Classification Search
CPC .. H04N 1/00949; G06F 3/1204; G06F 3/1275
USPC ....................................... 358/1.13
See application file for complete search history.

(56) References Cited

U.S. PATENT DOCUMENTS

| 2003/0090514 | A1 | 5/2003 | Cole et al. | |
|---|---|---|---|---|
| 2004/0046787 | A1* | 3/2004 | Henry | G06F 8/38 715/744 |
| 2014/0297354 | A1* | 10/2014 | Kogiso | G06F 9/46 705/7.26 |

FOREIGN PATENT DOCUMENTS

| JP | 2005507124 | 3/2005 |
|---|---|---|
| JP | 2011170672 | 9/2011 |

* cited by examiner

*Primary Examiner* — Allen H Nguyen
(74) *Attorney, Agent, or Firm* — JCIPRNET

(57) ABSTRACT

An information processing apparatus includes a processor configured to perform control such that display elements representing steps in a workflow are displayed in a row, and perform control such that a first display element representing a branch in the workflow is displayed in a mode indicating that a branch destination of the branch is not determined.

11 Claims, 14 Drawing Sheets

INFORMATION PROCESSING APPARATUS AND NON-TRANSITORY COMPUTER READABLE MEDIUM STORING PROGRAM FOR PERFORMING TO DISPLAY ELEMENTS REPRESENTING IN WORKFLOW AND INDICATING A BRANCH DESTINATION IN DETERMINING

CROSS-REFERENCE TO RELATED APPLICATIONS

This application is based on and claims priority under 35 USC 119 from Japanese Patent Application No. 2020-206540 filed Dec. 14, 2020.

BACKGROUND

(i) Technical Field

The present invention relates to an information processing apparatus and a non-transitory computer readable medium storing a program.

(ii) Related Art

JP2011-170672A describes an operation prediction device and an operation prediction method for determining a use case that best represents an actual operation history, estimating the user's system usage purpose based on the use case, and determining the next operation to be taken by matching the actual operation history of a user's software (system) with a system usage example assumed by a system developer.

JP2005-507124A describes a system for dynamically generating user interface display images supporting a specific business process, the system including: an information source that identifies a series of tasks included in a business process and relevant template forms for displaying a user interface; a tracking processor that identifies a specific task in the series of tasks and a template form associated with the specific task, an adaptive processor that modifies data representing the identified form to adapt the identified form in response to user context information that supports identification of form requirements; and an output processor that processes data representing the adapted form to be fit for output communication.

SUMMARY

In a configuration in which display elements representing steps in a workflow are displayed side by side in a row, in a case where the workflow includes a branch, the display elements representing the steps of a plurality of branch destinations of the branch cannot be displayed. In this case, it is conceivable that a display element representing the step up to the branch in the workflow and a display element representing the step at each branch destination of the branch are displayed side by side in a row, but the method complicates the display of the step of the workflow.

Aspects of non-limiting embodiments of the present disclosure relate to an information processing apparatus and a non-transitory computer readable medium storing a program that display display elements representing steps in a workflow in a row while indicating branch points in the workflow in the workflow including a branch.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform control such that display elements representing steps in a workflow are displayed in a row, and perform control such that a first display element representing a branch in the workflow is displayed in a mode indicating that a branch destination of the branch is not determined.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described in detail with reference to the accompanying drawings.

Hardware Configuration of Information Processing Apparatus

Figure 1:
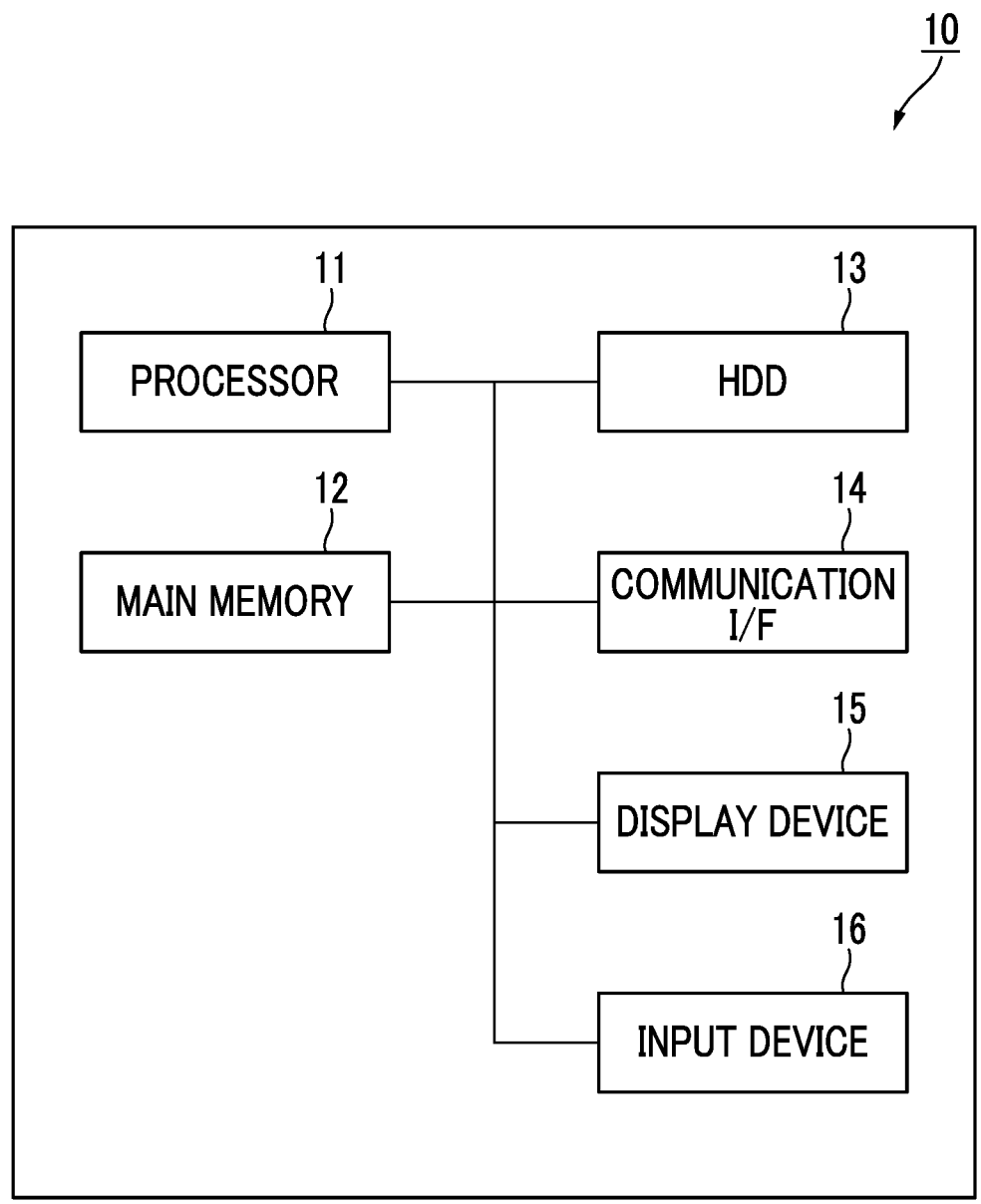
FIG. 1 is a diagram showing a hardware configuration example of an information processing apparatus according to an exemplary embodiment of the present invention.

FIG. 1 is a diagram showing a hardware configuration example of an information processing apparatus 10 according to this exemplary embodiment. As shown in FIG. 1, the information processing apparatus 10 includes a processor 11, a main memory 12, and a hard disk drive (HDD) 13. Here, the processor 11 executes various software, such as an operating system (OS) and an application, and realizes each function described later. The main memory 12 is a storage area for storing various software, data used for executing the software, and the like, and the HDD 13 is a storage area for storing input data for various software, output data from various software, and the like. Further, the information processing apparatus 10 includes a communication I/F (hereinafter referred to as an "I/F") 14 for communicating with the outside, a display device 15 such as a display, and an input device 16 such as a keyboard and a mouse.

Outline of this Exemplary Embodiment

In this exemplary embodiment, the information processing apparatus 10 displays display elements representing steps in a workflow in a row, and displays a first display element representing a branch in the workflow in a mode indicating that a branch destination of the branch is not determined.

Further, in this exemplary embodiment, in a case where the branch destination of the branch is determined as one branch destination, the information processing apparatus 10 may display a second display element representing a step of the one branch destination in the workflow instead of the first display element.

Here, the workflow is a definition of a business flow including a plurality of steps. The workflow may be stored in the information processing apparatus 10 or outside the information processing apparatus 10, but the case where the workflow is stored in the information processing apparatus 10 will be described below as an example. The display element may be any element displayed on the screen, but an icon will be described below as an example.

Figure 2:
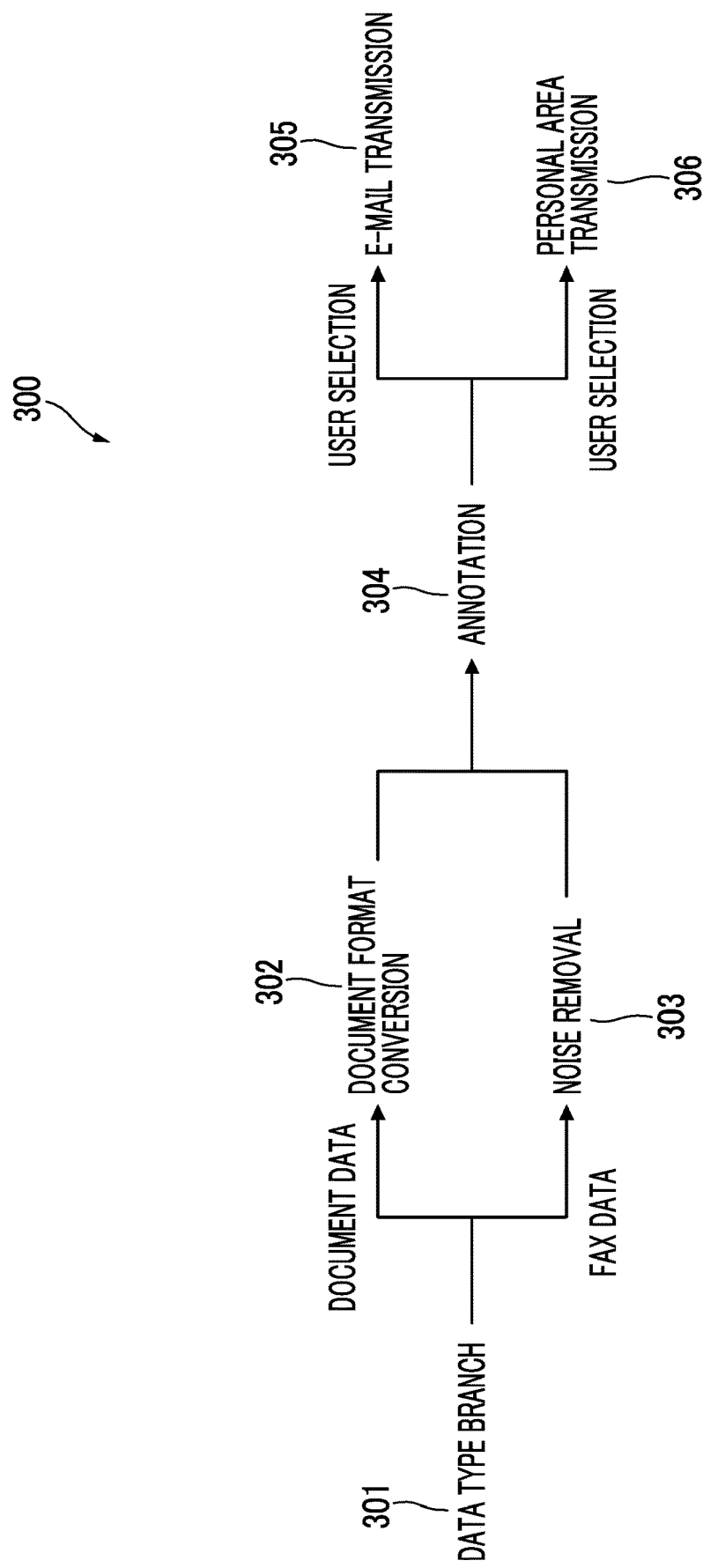
FIG. 2 is a diagram showing a first specific example of a workflow stored in the information processing apparatus.

FIG. 2 is a diagram showing a workflow 300, which is a first specific example of the workflow stored in the information processing apparatus 10. Here, document data and fax data are assumed as the data to be input to the workflow 300. Document data is data created by document creation software, and fax data is imaged data received by a facsimile machine.

As shown in FIG. 2, the workflow 300 includes a branch step 301 as a first step. The branch step 301 is a step of performing branching to the next step according to the type of input data.

Further, the workflow 300 includes a processing step 302 as a step of the branch destination in a case where the data type is determined to be document data in the branch step 301. The processing step 302 is a step of performing document format conversion processing of converting a format of the input document data into, for example, a format in which annotation processing in the next step can be executed. Further, the workflow 300 includes a processing step 303 as a step of the branch destination in a case where the data type is determined to be fax data in the branch step 301. The processing step 303 is a step of performing noise removal processing on the input fax data. It is assumed that the fax data is in a format in which, for example, annotation processing in the next step can be executed at the time of input.

Further, the workflow 300 includes a processing step 304 as a step after the document format conversion processing is performed in the processing step 302 and as a step after the noise removal processing is performed in the processing step 303. The processing step 304 is a step of performing annotation processing of pasting annotations on the document data subjected to the document format conversion processing or the fax data subjected to the noise removal processing.

Furthermore, the workflow 300 includes a processing step 305 and a processing step 306 as a step after the annotation processing is performed in the processing step 304. The processing step 305 is a step of performing e-mail transmission processing of transmitting the document data or fax data subjected to the annotation processing to an e-mail address of the destination user by e-mail. The processing step 306 is a step of performing personal area transmission processing of transmitting the document data or fax data subjected to the annotation processing in the processing step 304 to a personal storage area provided by software to the destination user. Here, the processing step 305 and the processing step 306 are steps of processing to be selected and executed by the user.

Figure 3:
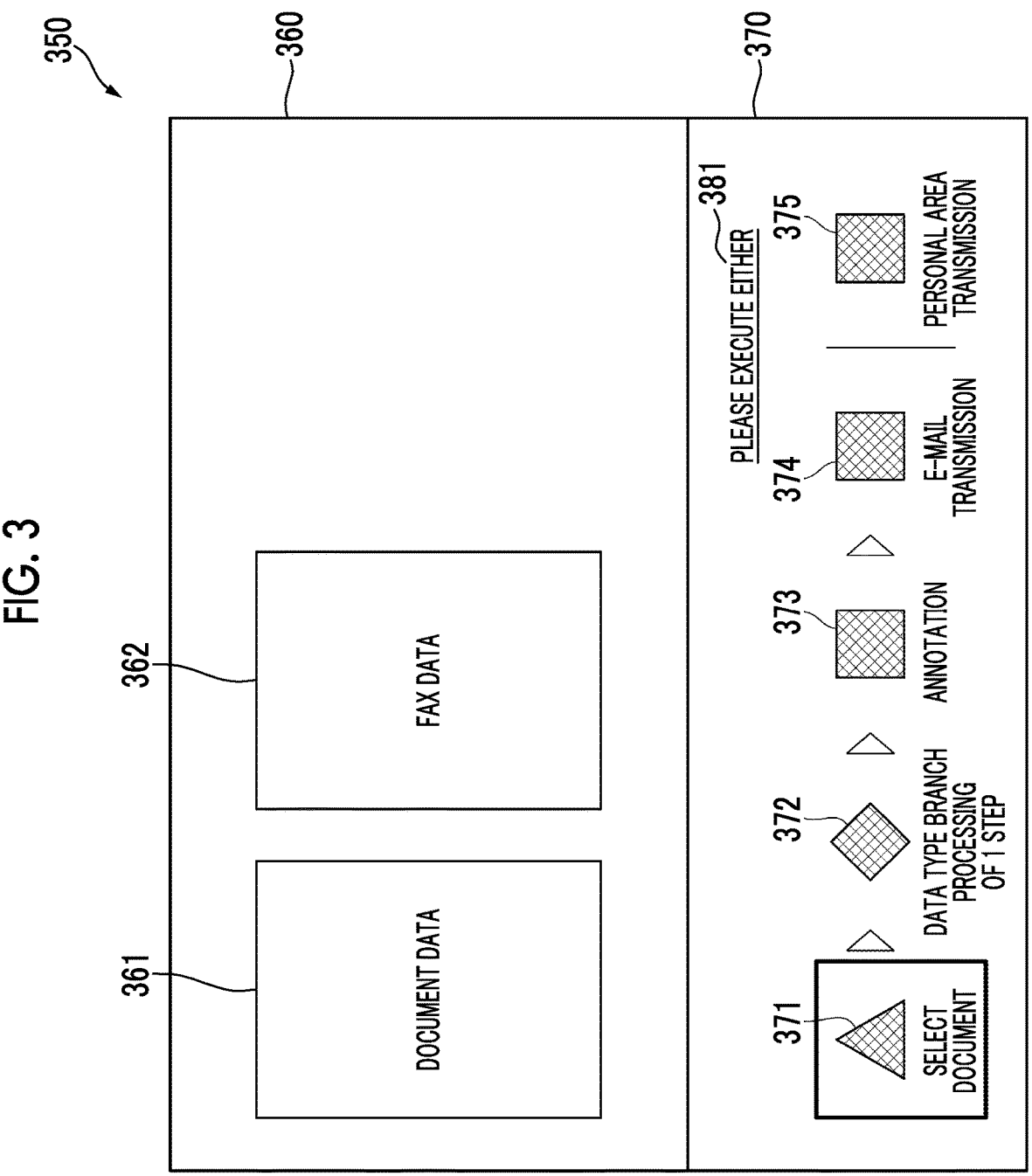
FIG. 3 is a diagram showing a display example of an initial state of a display screen displayed in a case where the information processing apparatus stores the first specific example of the workflow.

FIG. 3 is a diagram showing a display example of the initial state of the display screen 350 displayed on the display device 15 in a case where the information processing apparatus 10 stores the workflow 300 of FIG. 2.

As shown in FIG. 3, the display screen 350 includes a data display field 360 and a step display field 370.

In the data display field 360, a thumbnail image 361 of the document data and a thumbnail image 362 of the fax data are displayed as thumbnail images of the data to be selected.

In the step display field 370, a selection instruction icon 371, a branch icon 372, and processing icons 373 to 375 are displayed.

The selection instruction icon 371 is an icon for instructing the user to select either document data or fax data. In the initial state, the selection instruction icon 371 is an icon representing the step of the processing to be executed next by the user, and is therefore highlighted and displayed as shown by being surrounded with a thick line, indicating that the user can press the icon. The selection instruction icon 371 is an example of a fourth display element representing that an operation of the user is required to determine the branch destination. Further, the selection instruction icon 371 is displayed in association with the branch icon 372. Here, displaying in association with the branch icon 372 means displaying so that it can be seen that the display is related to the branch icon 372. For example, the selection instruction icon 371 may be displayed above or below the branch icon 372. In this case, a text string instructing data selection may be displayed instead of the icon. However, in the following, the selection instruction icon 371 will be described as being displayed on the left side of the branch icon 372.

The branch icon 372 is an icon representing the branch step 301 that branches according to the data type. Below the branch icon 372, "data type branch" is described, which indicates that the branch icon 372 is an icon representing a step of branching according to the data type. The branch icon 372 is an example of a first display element representing a branch in the workflow. In addition, information regarding steps of a plurality of branch destinations may be displayed in association with the branch icon 372. Here, displaying in association with the branch icon 372 means displaying so that it can be seen that the display is related to the branch icon 372. For example, in a case where the mouse cursor is placed on the branch icon 372, information regarding the steps of the plurality of branch destinations may be displayed. However, in the following, a case where information regarding the step of each branch destination is displayed below the branch icon 372 will be described as an example. Further, the information regarding the step of each branch destination includes a name of the step of each branch destination and the like, but here, the number of processing steps of each branch destination will be described as an example. In particular, the minimum number and the maximum number of processing steps at the plurality of branch destinations may be displayed. In the workflow 300, at the branch destination of the branch step 301, the processing step 302 is executed in the case where the document data is selected, and the processing step 303 is executed in the case where the fax data is selected. Therefore, since the number of steps of the branch destination is 1 in each case, "processing of 1 step" is displayed below the branch icon 372.

The processing icon 373 is an icon representing the processing step 304 of performing the annotation processing of pasting annotations on document data or fax data. In the workflow 300, since it is confirmed that the annotation processing is performed regardless of the type of the input data, the processing icon 373 is displayed in the initial state.

The processing icon 374 is an icon representing the processing step 305 of performing the e-mail transmission processing of attaching document data or fax data to an e-mail and transmitting the e-mail to the e-mail address of the destination user. The processing icon 375 is an icon representing the processing step 306 of performing the personal area transmission processing of transmitting document data or fax data to the personal storage area of the destination user. Here, in the workflow 300, since it is assumed that the user selects either the processing step 305 or the processing step 306, the processing icon 374 and the processing icon 375 are displayed together. Then, above the processing icon 374 and the processing icon 375, a wording 381 indicating that the processing of any of the steps is to be selected is displayed.

Figure 4:
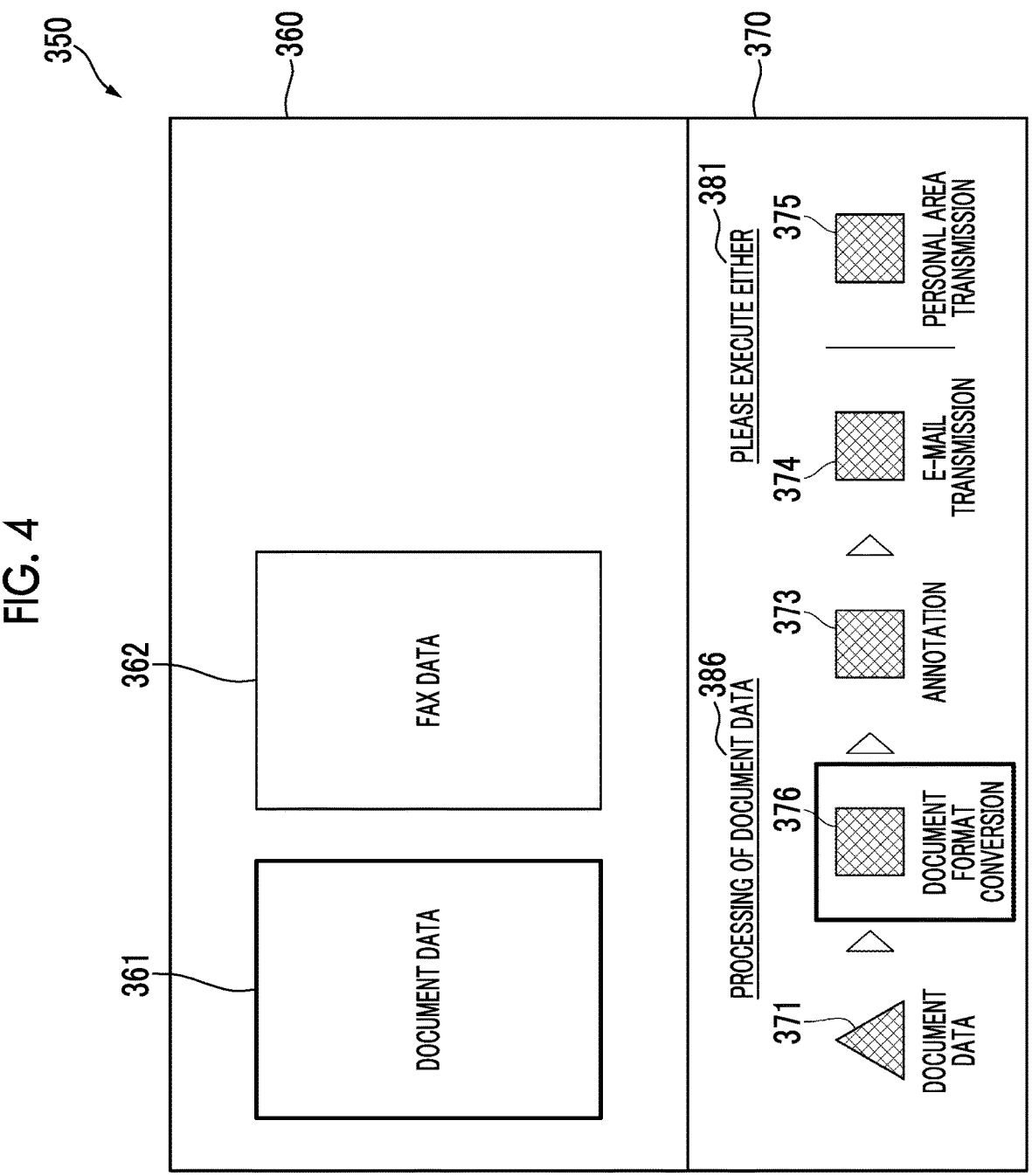
FIG. 4 is a diagram showing a display example at the time when document data of the display screen displayed in a case where the information processing apparatus stores the first specific example of the workflow is selected.

FIG. 4 is a diagram showing a display example at the time when document data of the display screen 350 displayed on the display device 15 in a case where the information processing apparatus 10 stores the workflow 300 of FIG. 2 is selected.

Even here, the display screen 350 includes the data display field 360 and the step display field 370.

In the data display field 360, the thumbnail image 361 of the document data and the thumbnail image 362 of the fax data are displayed as thumbnail images representing the data to be selected. However, here, it is indicated that the document data is selected by surrounding the thumbnail image 361 of the document data with a thick line.

In the step display field 370, the selection instruction icon 371, a processing icon 376, and the processing icons 373 to 375 are displayed.

Among the icons, below the selection instruction icon 371, a text string of "document data" indicating the data type selected in the data display field 360 is displayed.

Further, since the document data is selected in the data display field 360, the processing icon 376 representing the processing step 302 of performing the document format conversion processing is displayed instead of the branch icon 372. Then, the processing icon 376 is an icon representing the processing to be executed next by the user, and is therefore highlighted and displayed as shown by being surrounded with a thick line, indicating that the user can press the icon. The processing icon 376 is an example of a second display element representing the step of one branch destination in the workflow. Further, above the processing icon 376, a wording 386 indicating that this icon is displayed because the document data is selected in the data display field 360 is displayed.

Figure 5:
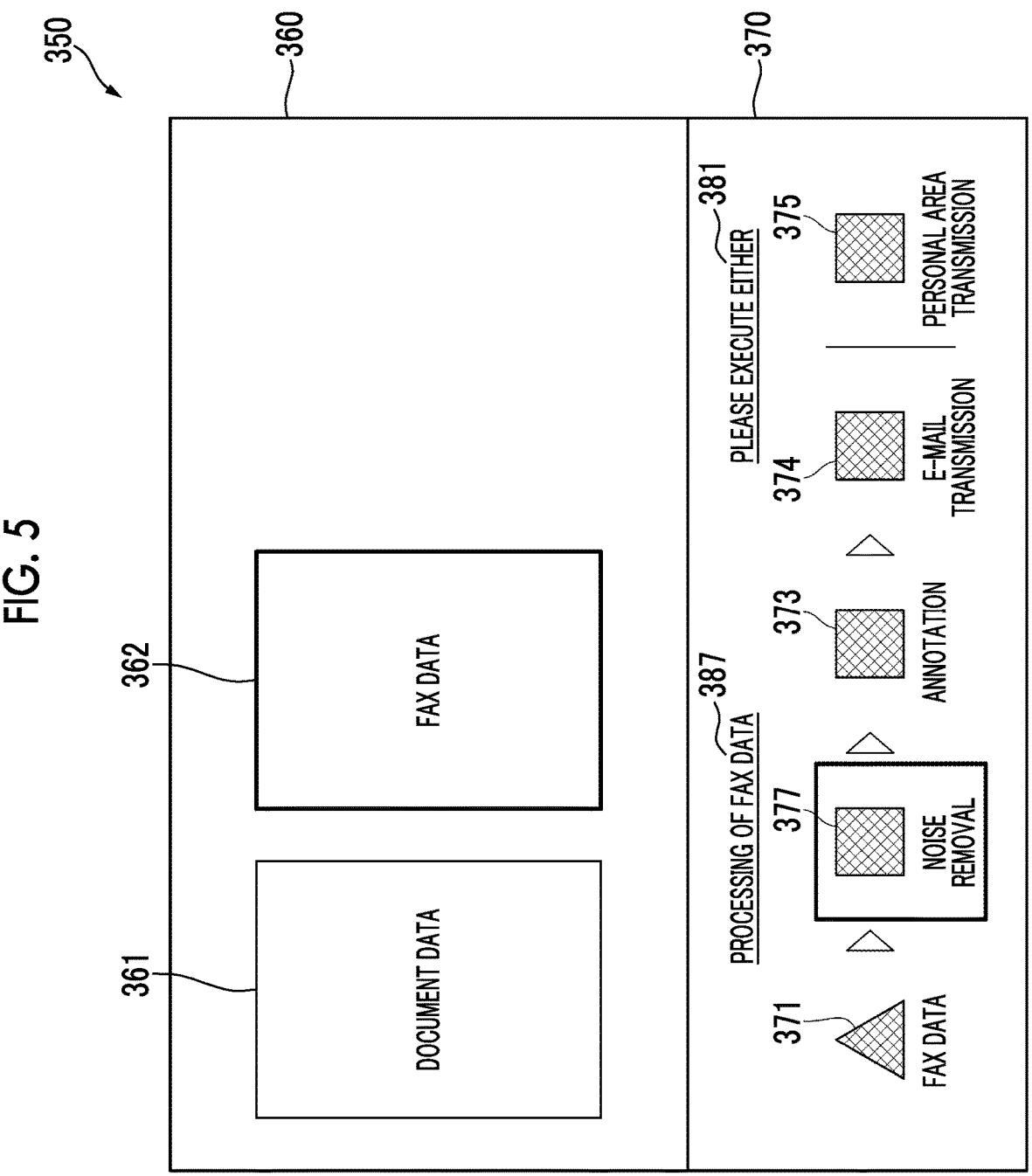
FIG. 5 is a diagram showing a display example at the time when fax data of the display screen displayed in a case where the information processing apparatus stores the first specific example of the workflow is selected.

FIG. 5 is a diagram showing a display example at the time when fax data of the display screen 350 displayed on the display device 15 in a case where the information processing apparatus 10 stores the workflow 300 of FIG. 2 is selected.

Even here, the display screen 350 includes the data display field 360 and the step display field 370.

In the data display field 360, the thumbnail image 361 of the document data and the thumbnail image 362 of the fax data are displayed as thumbnail images representing the data to be selected. However, here, it is indicated that the fax data is selected by surrounding the thumbnail image 362 of the fax data with a thick line.

In the step display field 370, the selection instruction icon 371, a processing icon 377, and the processing icons 373 to 375 are displayed.

Among the icons, below the selection instruction icon 371, a text string of "fax data" indicating the data type selected in the data display field 360 is displayed.

Further, since the fax data is selected in the data display field 360, the processing icon 377 representing the processing step 303 of performing the noise removal processing is displayed instead of the branch icon 372. Then, the processing icon 377 is an icon representing the processing to be executed next by the user, and is therefore highlighted and displayed as shown by being surrounded with a thick line, indicating that the user can press the icon. The processing icon 377 is an example of the second display element representing the step of one branch destination in the workflow. Further, above the processing icon 377, a wording 387 indicating that this icon is displayed because the fax data is selected in the data display field 360 is displayed.

Figure 6:
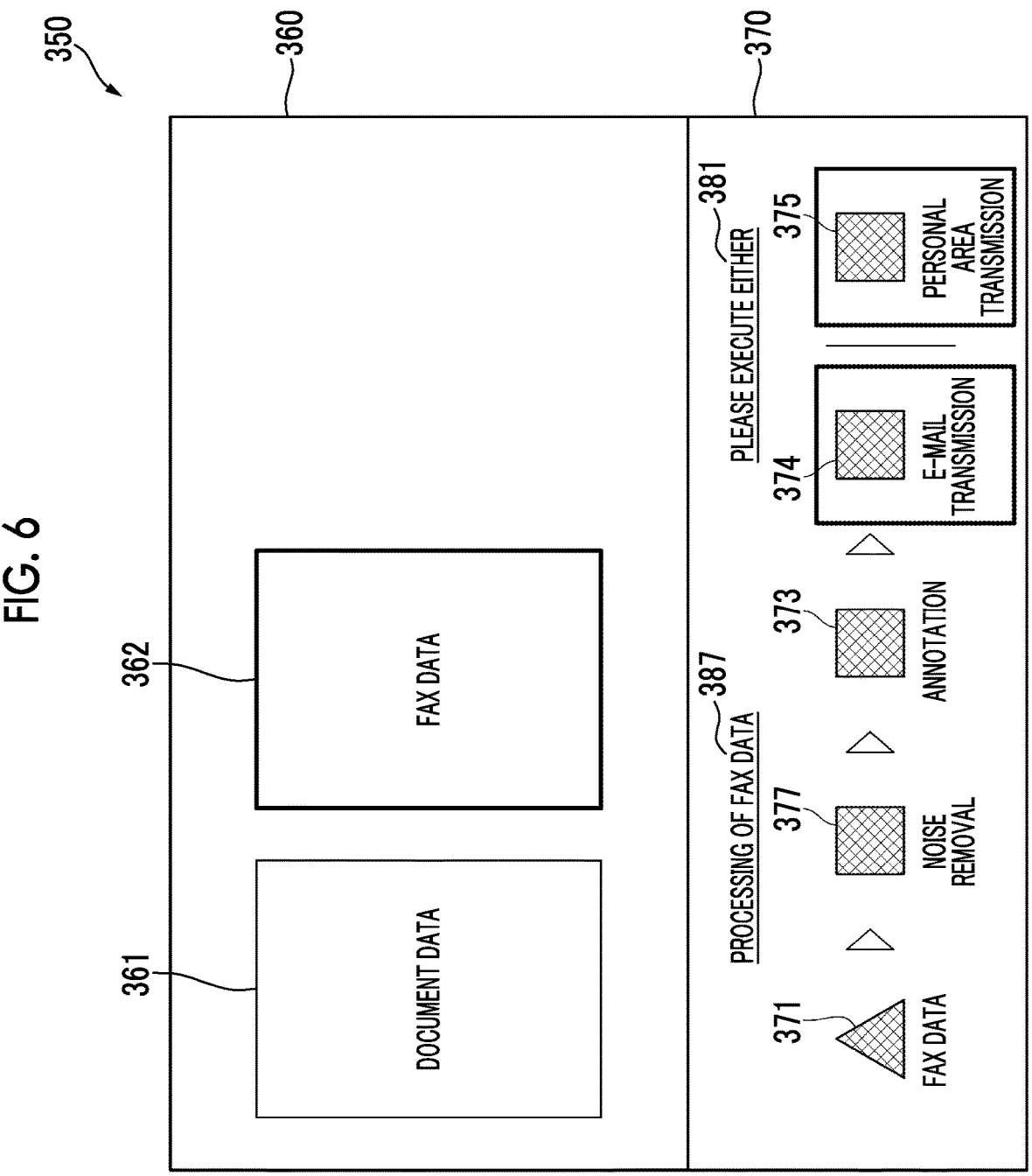
FIG. 6 is a diagram showing a display example after fax data of the display screen displayed in a case where the information processing apparatus stores the first specific example of the workflow is selected and annotation processing is performed.

FIG. 6 shows a display example after fax data of the display screen 350 displayed on the display device 15 in a case where the information processing apparatus 10 stores the workflow 300 of FIG. 2 is selected and annotation processing is performed.

Even here, the display screen 350 includes the data display field 360 and the step display field 370.

In the data display field 360, the thumbnail image 361 of the document data and the thumbnail image 362 of the fax data are displayed as thumbnail images representing the data to be selected. Further, even here, it is indicated that the fax data is selected by surrounding the thumbnail image 362 of the fax data with a thick line.

In the step display field 370, the selection instruction icon 371, the processing icon 377, and the processing icons 373 to 375 are displayed. Among the icons, the processing icon 374 and the processing icon 375 are icons representing the processing to be executed next by the user, and the user can select one of the icons. Therefore, the icons are collectively highlighted and displayed as shown by being surrounded with thick lines, indicating that the user can press the icons.

Figure 7:
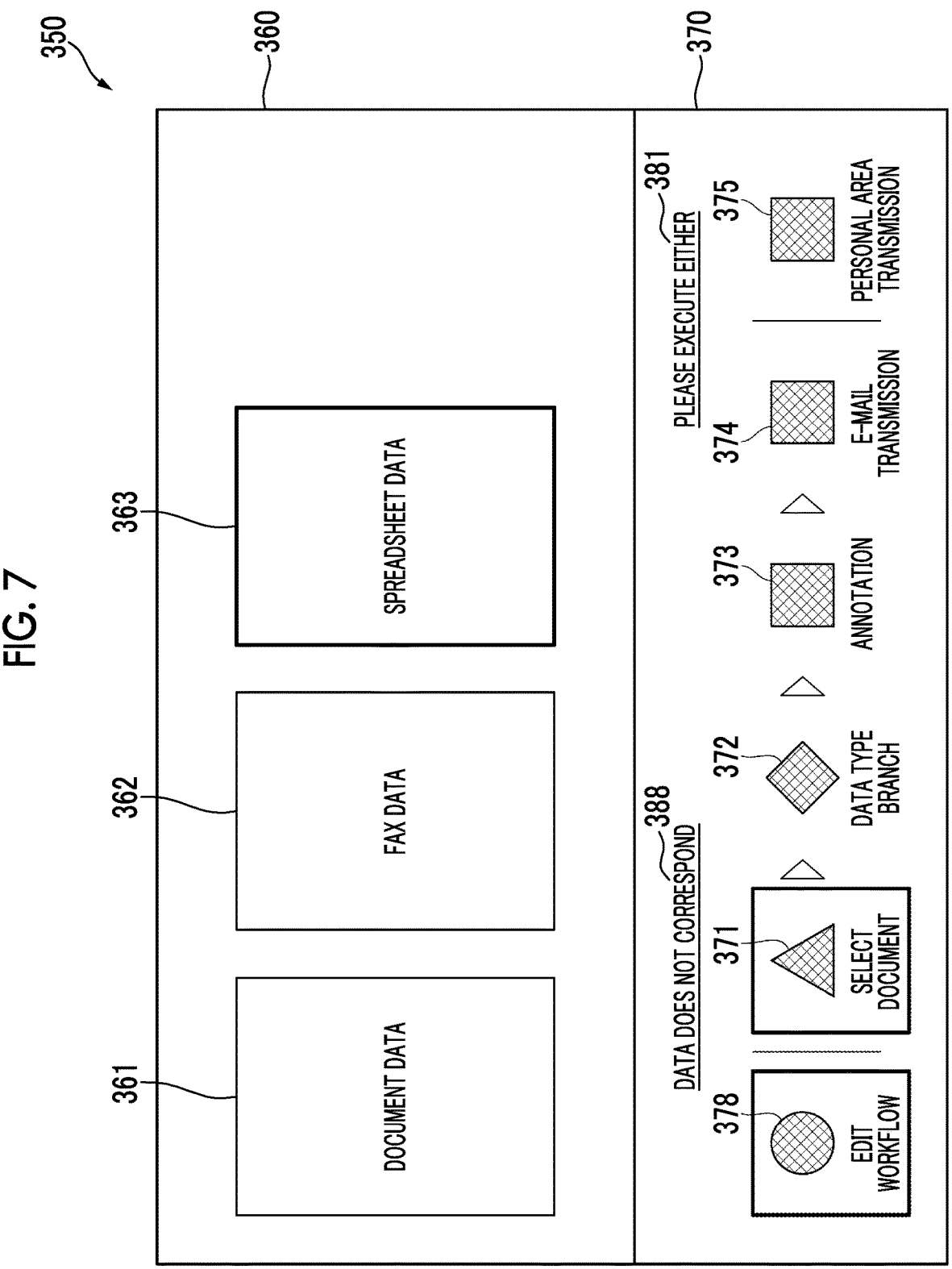
FIG. 7 is a diagram showing a display example at the time when spreadsheet data of the display screen displayed in a case where the information processing apparatus stores the first specific example of the workflow is selected.

FIG. 7 is a diagram showing a display example at the time when spreadsheet data of the display screen 350 displayed on the display device 15 in a case where the information processing apparatus 10 stores the workflow 300 of FIG. 2 is selected.

Even here, the display screen 350 includes the data display field 360 and the step display field 370.

In the data display field 360, the thumbnail image 361 of the document data, the thumbnail image 362 of the fax data, and a thumbnail image 363 of the spreadsheet data are displayed as thumbnail images representing the data to be selected. Further, here, it is indicated that the spreadsheet data is selected by surrounding the thumbnail image 363 of the spreadsheet data with a thick line.

In the step display field 370, the selection instruction icon 371, the branch icon 372, the processing icons 373 to 375, and an edit instruction icon 378 are displayed. In the workflow 300 of FIG. 2, spreadsheet data is not assumed as input data. That is, in a case where the data type is determined to be spreadsheet data in the branch represented by the branch icon 372, the processing is not defined at the branch destination. The information processing apparatus 10 displays an alert at the time when the information processing apparatus 10 detects that no processing is defined at the branch destination. In FIG. 7, as an alert, the edit instruction icon 378 for instructing the edit of the workflow 300 is displayed. The fact that the processing is not defined at the branch destination is an example of a problem in determining the branch destination of the branch. The edit instruction icon 378 is an example of information indicating that the workflow is to be edited. That is, the processing performed by the information processing apparatus 10 here is an example of outputting information indicating that the workflow is to be edited in a case where there is a problem in determining the branch destination of the branch. Further, a wording 388 indicating that the data does not correspond is displayed above the edit instruction icon 378, the selection instruction icon 371, and the branch icon 372. However, in a case where the user who has selected the spreadsheet data does not have the editing authority for the workflow 300, the user who has the editing authority for the workflow 300 may be notified. Alternatively, instead of having the workflow 300 edited, it may be prompted to select the type of data assumed as the input data in the workflow 300.

Figure 8:
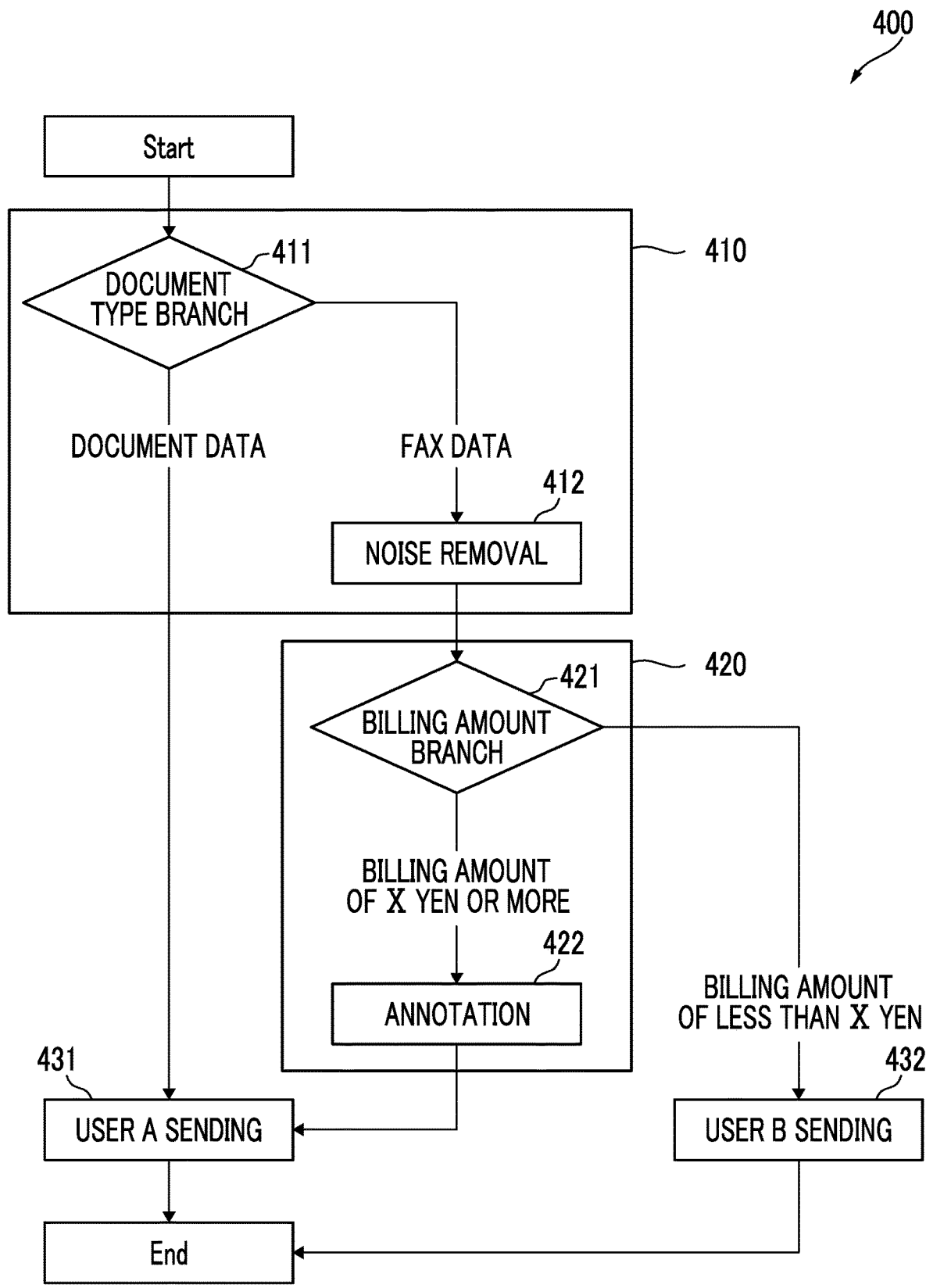
FIG. 8 is a diagram showing a second specific example of a workflow stored in the information processing apparatus.

FIG. 8 is a diagram showing a workflow 400, which is a second specific example of the workflow stored in the information processing apparatus 10. Here, document data and fax data of a bill including a billing amount are assumed as the data to be input to the workflow 400.

As shown in FIG. 8, the workflow 400 includes a branch block 410 as a first branch block. The branch block 410 includes a branch step 411 as a first step. The branch step 411 is a step of performing branching to the next step according to the type of input data. Further, the branch block 410 includes a processing step 412 as a step of the branch destination in a case where the data type is determined to be fax data in the branch step 411. The processing step 412 is a step of performing noise removal processing on the input fax data.

Further, the workflow 400 includes a branch block 420 as a branch block of the branch destination in a case where the data type is determined to be fax data in the branch step 411. The branch block 420 includes a branch step 421 as a first step. The branch step 421 is a step of performing branching to the next step according to the billing amount extracted from the input data. Further, the branch block 420 includes a processing step 422 as a branch destination step in a case where the billing amount is determined to be X yen or more in the branch step 421. The processing step 422 is a step of performing annotation processing for pasting annotations on the fax data subjected to the noise removal processing in the processing step 412.

Further, the workflow 400 includes a processing step 431 as a step of the branch destination in a case where the data type is determined to be document data in the branch step 411, and as a step of after the annotation processing is performed in the processing step 422. The processing step 431 is a step of performing user A sending processing of sending the input document data or the fax data subjected to the annotation processing in the processing step 422 to a user A.

Furthermore, the workflow 400 includes a processing step 432 as a step of the branch destination in a case where the billing amount is determined to be less than X yen in the branch step 421. The processing step 432 is a step of performing user B sending processing of sending the fax data subjected to the noise removal processing in the processing step 412 to a user B.

Figure 9:
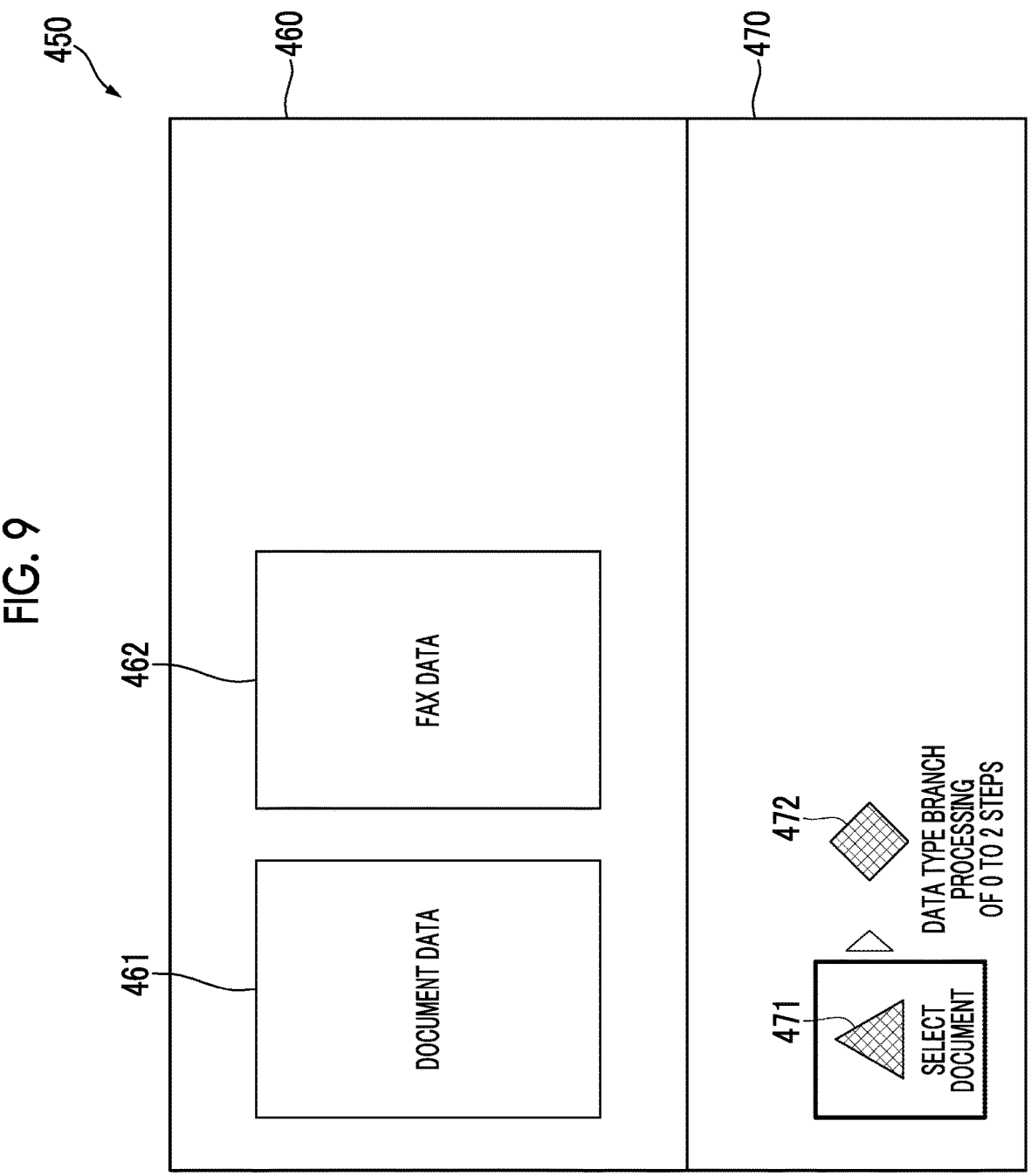
FIG. 9 is a diagram showing a display example of an initial state of a display screen displayed in a case where the information processing apparatus stores the second specific example of the workflow.

FIG. 9 is a diagram showing a display example of the initial state of the display screen 450 displayed on the display device 15 in a case where the information processing apparatus 10 stores the workflow 400 of FIG. 3.

As shown in FIG. 9, the display screen 450 includes a data display field 460 and a step display field 470.

In the data display field 460, the thumbnail image 461 of the document data and the thumbnail image 462 of the fax data are displayed as thumbnail images representing the data to be selected.

In the step display field 470, a selection instruction icon 471 and a branch icon 472 are displayed. In the workflow 400, the processing icon is not displayed because the processing to be executed is not determined unless the data type is determined.

The selection instruction icon 471 is an icon for instructing the user to select either document data or fax data. In the initial state, the selection instruction icon 471 is an icon representing the step of the processing to be executed next by the user, and is therefore highlighted and displayed as shown by being surrounded with a thick line, indicating that the user can press the icon. The selection instruction icon 471 is an example of the fourth display element representing that an operation of the user is required to determine the branch destination. Further, the selection instruction icon 471 is displayed in association with the branch icon 472. Here, displaying in association with the branch icon 472 means displaying so that it can be seen that the display is related to the branch icon 472. For example, it may be displayed above or below the branch icon 472. In this case, a text string instructing data selection may be displayed instead of the icon. However, in the following, the selection instruction icon 471 will be described as being displayed on the left side of the branch icon 472.

The branch icon 472 is an icon representing the branch step 411 that branches according to the data type. Below the branch icon 472, "data type branch" is described, which indicates that the branch icon 472 is an icon representing a step of branching according to the data type. The branch icon 472 is an example of the first display element representing a branch in the workflow. In addition, information regarding steps of a plurality of branch destinations may be displayed in association with the branch icon 472. Here, displaying in association with the branch icon 472 means displaying so that it can be seen that the display is related to the branch icon 472. For example, in a case where the mouse cursor is placed on the branch icon 472, information regarding the steps of the plurality of branch destinations may be displayed. However, in the following, a case where information regarding the step of each branch destination is displayed below the branch icon 472 will be described as an example. Further, the information regarding the step of each branch destination includes a name of the step of each branch destination and the like, but here, the number of processing steps of each branch destination will be described as an example. In particular, the minimum number and the maximum number of processing steps at the plurality of branch destinations may be displayed. In the workflow 400, at the branch destination of the branch step 411, the processing step is not executed in the case where the document data is selected, and the processing step 412 is executed in the case where the fax data is selected. However, the processing step 422 may or may not be executed. Therefore, since the minimum value of the number of steps of the branch destination is 0, and the maximum value of the number of steps of the branch destination is 2, "processing of 0 to 2 steps" is displayed below the branch icon 472.

Figure 10:
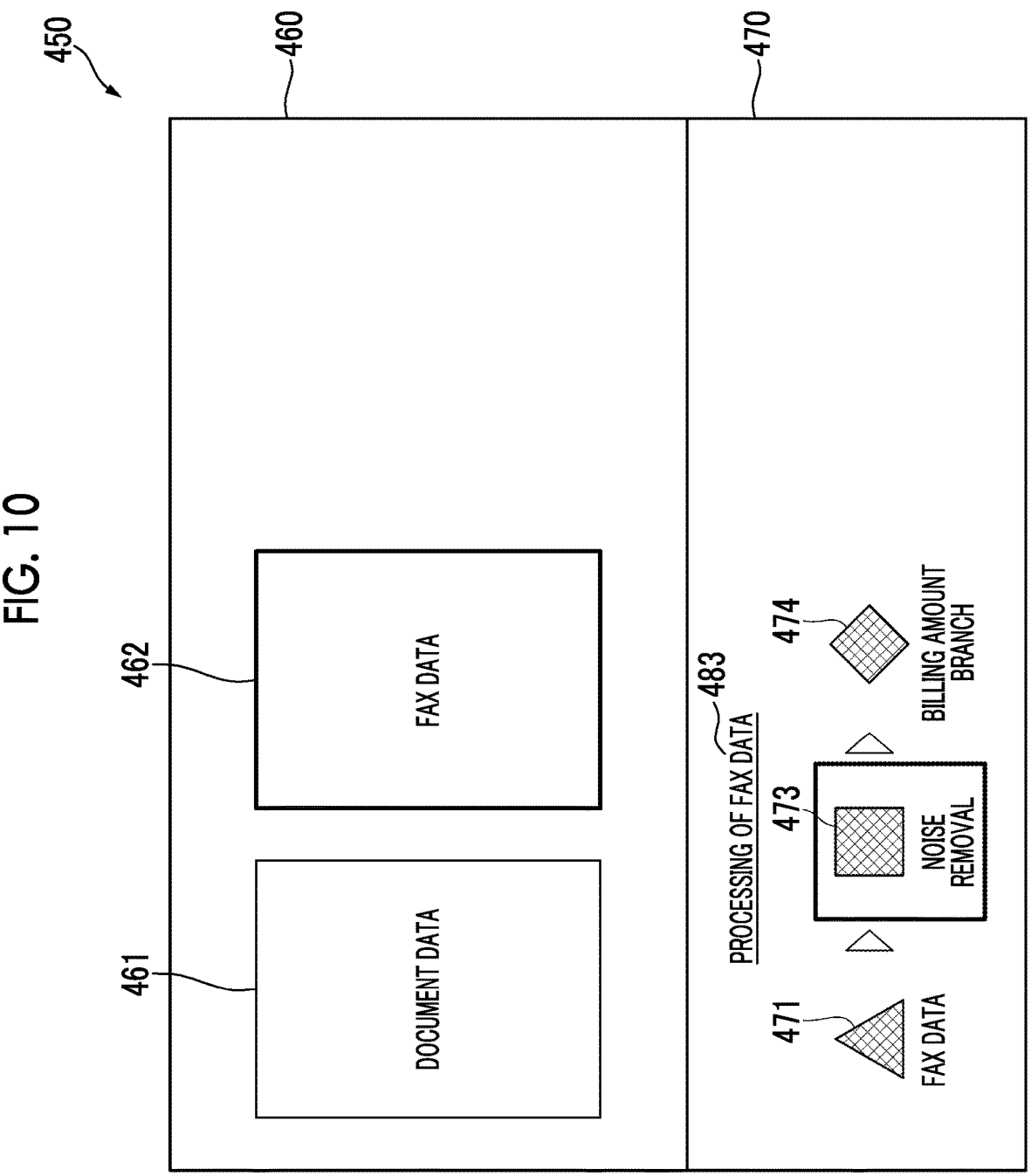
FIG. 10 is a diagram showing a display example at the time when fax data of the display screen displayed in a case where the information processing apparatus stores the second specific example of the workflow is selected.

FIG. 10 is a diagram showing a display example at the time when fax data of the display screen 450 displayed on the display device 15 in a case where the information processing apparatus 10 stores the workflow 400 of FIG. 3 is selected.

Even here, the display screen 450 includes the data display field 460 and the step display field 470.

In the data display field 460, the thumbnail image 461 of the document data and the thumbnail image 462 of the fax data are displayed as thumbnail images representing the data to be selected. However, here, it is indicated that the fax data is selected by surrounding the thumbnail image 462 of the fax data with a thick line.

In the step display field 470, a selection instruction icon 471, a processing icon 473, and a branch icon 474 are displayed.

Among the icons, below the selection instruction icon 471, a text string of "fax data" indicating the data type selected in the data display field 460 is displayed.

Further, since the fax data is selected in the data display field 460, the processing icon 473 representing the processing step 412 of performing the noise removal processing is displayed instead of the branch icon 472. The processing icon 473 is an icon representing a processing step up to the next branch or the confluence of the branch destinations. Then, the processing icon 473 is an icon representing the processing to be executed next by the user, and is therefore highlighted and displayed as shown by being surrounded with a thick line, indicating that the user can press the icon. The processing icon 473 is an example of the second display element representing the step of one branch destination in the workflow. Further, above the processing icon 473, a wording 483 indicating that this icon is displayed because the fax data is selected in the data display field 460 is displayed.

Further, the branch icon 474 is a newly displayed icon, and is an icon representing the branch step 421 that branches according to the billing amount. Below the branch icon 474, "billing amount branch" is described, which indicates that the branch icon 474 is an icon representing a step of branching according to the billing amount. The branch icon 474 is an example of the first display element representing a branch in the workflow. In addition, information regarding steps of a plurality of branch destinations may be displayed in association with the branch icon 474. Here, displaying in association with the branch icon 474 means displaying so that it can be seen that the display is related to the branch icon 474. For example, in a case where the mouse cursor is placed on the branch icon 474, information regarding the steps of the plurality of branch destinations may be displayed. However, in the following, a case where information regarding the step of each branch destination is displayed below the branch icon 474 will be described as an example. Further, the information regarding the step of each branch destination includes a name of the step of each branch destination and the like, but here, the number of processing steps of each branch destination will be described as an example. In particular, the minimum number and the maximum number of processing steps at the plurality of branch destinations may be displayed. In the workflow 400, at the branch destination of the branch step 421, the processing step 422 is executed in the case where the billing amount is X yen or more, and the processing step is not executed in the case where the billing amount is less than X yen. Therefore, since the minimum value of the number of steps of the branch destination is 0, and the maximum value of the number of steps of the branch destination is 1, "processing of 0 to 1 steps" is displayed below the branch icon 474.

Figure 11:
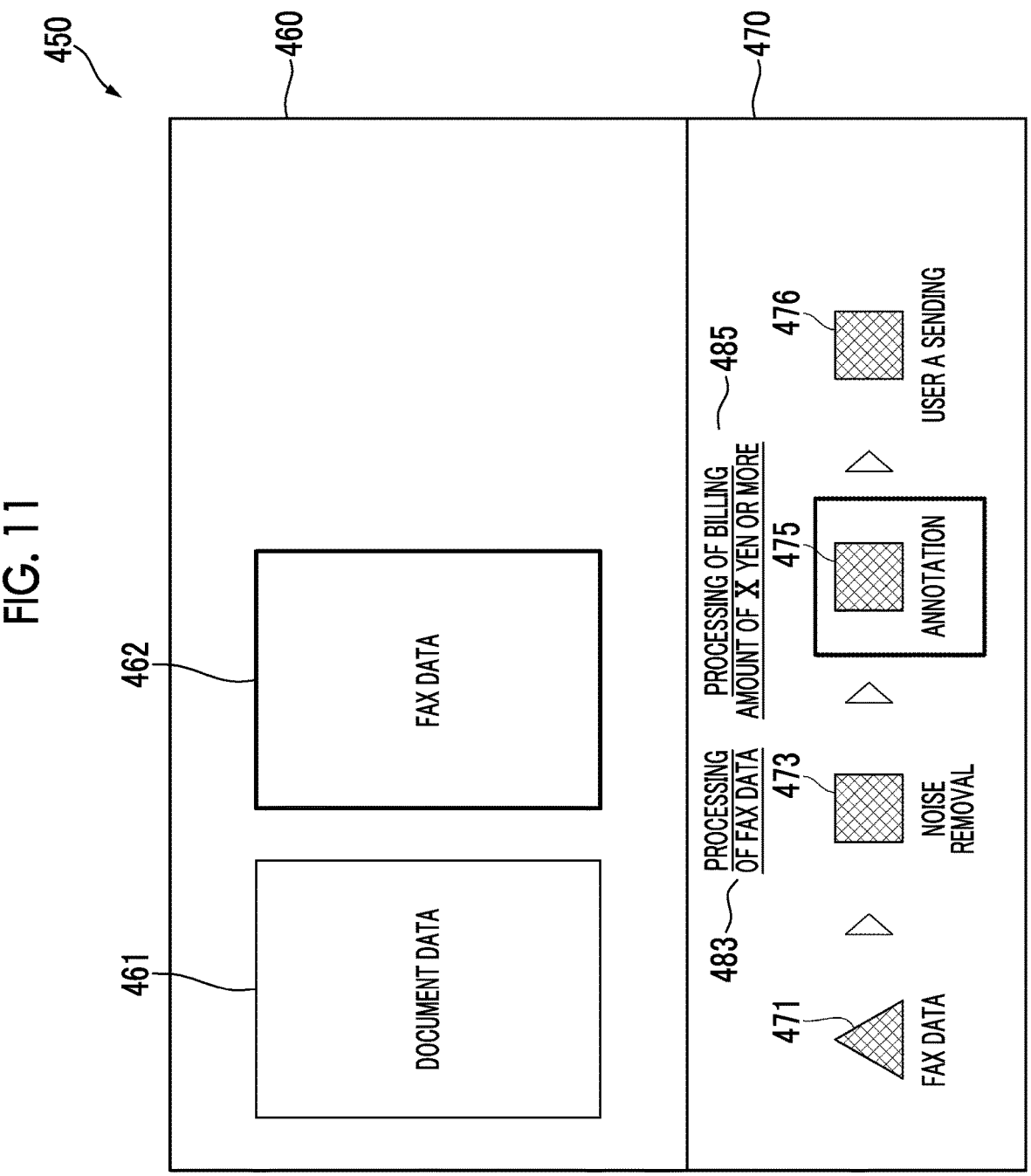
FIG. 11 is a diagram showing a display example at the time when a billing amount of the display screen displayed in a case where the information processing apparatus stores the first specific example of the workflow is determined to be X yen or more.

FIG. 11 is a diagram showing a display example at the time when billing amount of the display screen 450 displayed on the display device 15 in a case where the information processing apparatus 10 stores the workflow 400 of FIG. 3 is determined to be X yen or more.

Even here, the display screen 450 includes the data display field 460 and the step display field 470.

In the data display field 460, the thumbnail image 461 of the document data and the thumbnail image 462 of the fax data are displayed as thumbnail images representing the data to be selected. Further, even here, it is indicated that the fax data is selected by surrounding the thumbnail image 462 of the fax data with a thick line.

In the step display field 470, the selection instruction icon 471, the processing icon 473, a processing icon 475, and a processing icon 476 are displayed.

Since the billing amount extracted from the fax data selected in the data display field 460 is determined to be X yen or more, the processing icon 475 representing the processing step 422 of performing the annotation processing is displayed instead of the branch icon 474. The processing icon 475 is an icon representing a processing step up to the next branch or the confluence of the branch destinations. Then, the processing icon 475 is an icon representing the processing to be executed next by the user, and is therefore highlighted and displayed as shown by being surrounded with a thick line, indicating that the user can press the icon. The processing icon 475 is an example of the second display element representing the step of one branch destination in the workflow. Further, above the processing icon 475, a wording 485 indicating that this icon is displayed because the billing amount extracted from the fax data is determined to be X yen or more is displayed. The processing of determining whether the billing amount extracted from the fax data is X yen or more is an example of a specific processing that does not require an operation of the user. The wording 485 is an example of information indicating that one branch destination has been determined based on the result of the specific processing. Further, the wording 485 does not necessarily have to be displayed above the processing icon 475, and may be displayed in association with the processing icon 475. Here, displaying in association with the processing icon 475 means displaying so that it can be seen that the display is related to the processing icon 475. For example, in a case where the mouse cursor is placed on the processing icon 475, information on what kind of processing result the processing icon 475 is displayed may be displayed.

Further, in this case, since it is confirmed that the processing step 431 is executed after the processing step 422 represented by the processing icon 475 is executed, the processing icon 476 representing the processing step 431 is also displayed.

Figure 12:
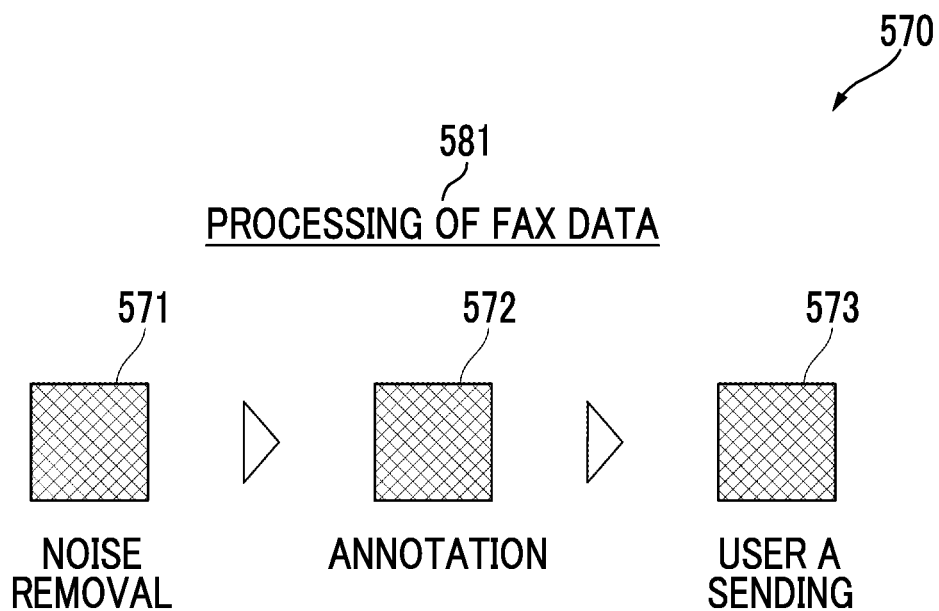
FIG. 12 is a diagram showing a display example of a step display field of a display screen displayed by the information processing apparatus in a case where there are a plurality of processing steps at a branch destination of a branch in the workflow.

FIG. 12 is a diagram showing a display example of a step display field 570 of a display screen displayed on the display device 15 by the information processing apparatus 10 in a case where there are a plurality of processing steps at a branch destination of a branch in the workflow. The step display field 570 is also displayed together with the data display field, but the data display field is omitted because it is the same as that shown in FIGS. 3 to 7 and 9 to 11.

As shown in FIG. 12, processing icons 571 to 573 are displayed in the step display field 570. The processing icon 571 is an icon representing a processing step of performing noise removal processing. The processing icon 572 is an icon representing a processing step of performing annotation processing. The processing icon 573 is an icon representing a processing step of performing user A sending processing of sending the data to a user A. Here, it is assumed that these processing steps are processing steps executed in a case where the data type is determined to be fax data in the branch step that branches to the next step according to the type of input data. In this case, these processing icons 571 to 573 are displayed together. That is, above the processing icons 571 to 573, a wording 581 indicating that these icons are displayed because the fax data is selected in the data display field is displayed. Assuming that the processing icon 571 is an example of the second display element representing a step of one branch destination in the workflow, the processing icon 572 or the processing icon 573 is an example of a third display element representing another step of one branch destination in the workflow. Further, displaying the processing icons 571 to 573 together is an example of displaying the second display element and the third display element as a group.

Figure 13:
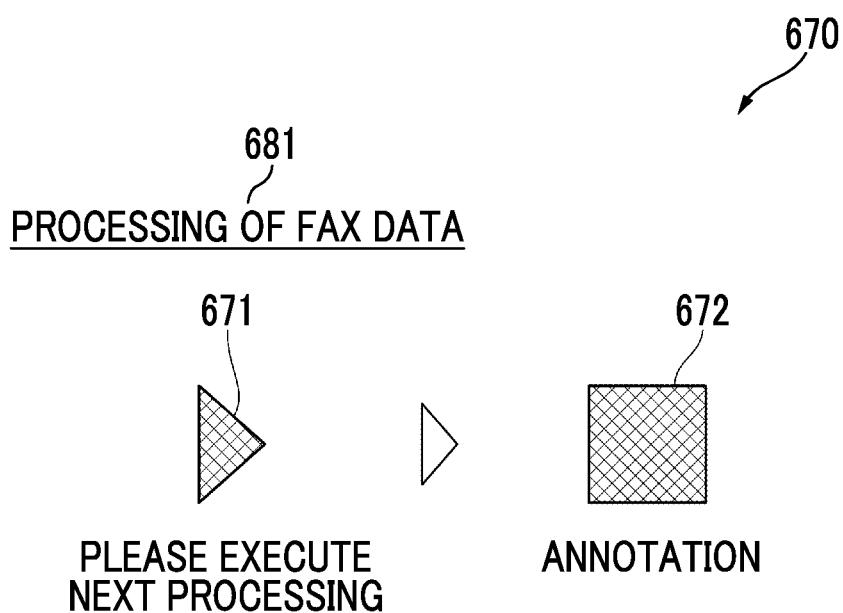
FIG. 13 is a diagram showing a display example of a step display field of a display screen displayed by the information processing apparatus in a case where there is no processing step at the branch destination of the branch in the workflow.

FIG. 13 is a diagram showing a display example of a step display field 670 of a display screen displayed on the display device 15 by the information processing apparatus 10 in a case where there is no processing step at a branch destination of a branch in the workflow. The step display field 670 is also displayed together with the data display field, but the data display field is omitted because it is the same as that shown in FIGS. 3 to 7 and 9 to 11.

As shown in FIG. 13, a next processing instruction icon 671 and a processing icon 672 are displayed in the step display field 670. The next processing instruction icon 671 is an icon for instructing the execution of the next processing step. The processing icon 672 is an icon representing a processing step of performing annotation processing. Here, since the wording 681 of "processing of fax data" is displayed above the next processing instruction icon 671, in a case where the input data is fax data, the processing step is not executed, and the processing step represented by the processing icon 672 is executed.

Figure 14:
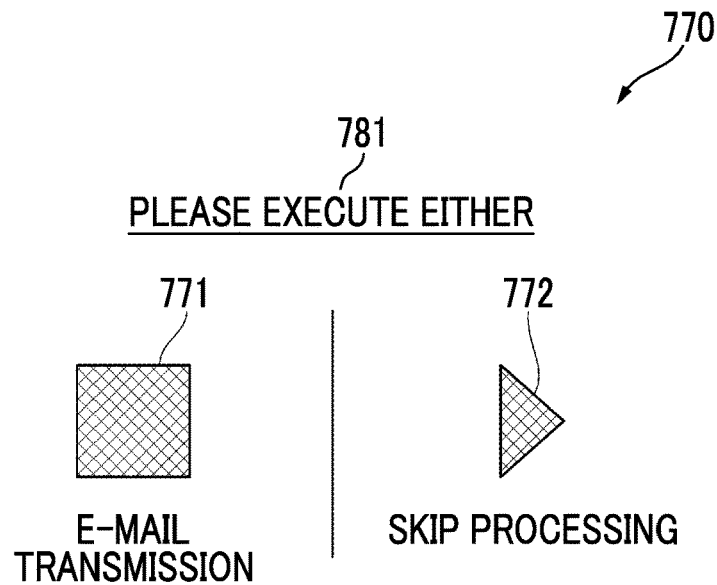
FIG. 14 is a diagram showing a display example of a step display field of a display screen displayed by the information processing apparatus in a case where skip can be selected as a processing step that can be selected by a user in the workflow.

FIG. 14 is a diagram showing a display example of a step display field 770 of a display screen displayed on the display device 15 by the information processing apparatus 10 in a case where skip can be selected as a processing step that can be selected by a user in the workflow. The step display field 770 is also displayed together with the data display field, but the data display field is omitted because it is the same as that shown in FIGS. 3 to 7 and 9 to 11.

As shown in FIG. 14, a processing icon 771 and a skip icon 772 are displayed in the step display field 770. The processing icon 771 is an icon representing a processing step of performing e-mail transmission processing in which data is attached to an e-mail and transmitted. The skip icon 772 is an icon that is pressed at the time when the user skips the processing. Here, a wording 781 "Please execute either" is displayed above the processing icon 771 and the skip icon 772. Therefore, the user can proceed to the next step after executing the processing step represented by the processing icon 771, or can proceed to the next step without executing the processing step.

Functional Configuration of Information Processing Apparatus

Figure 15:
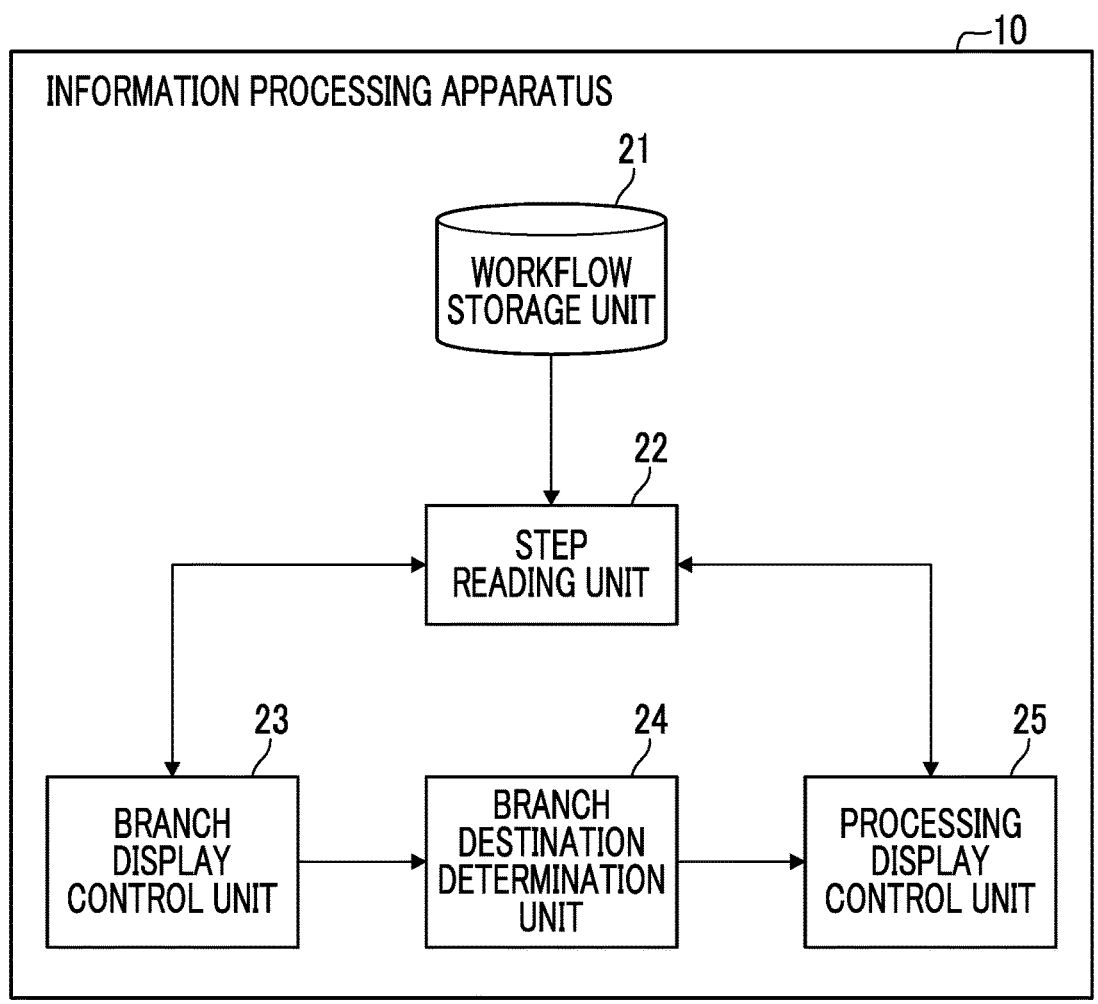
FIG. 15 is a block diagram showing a functional configuration example of the information processing apparatus according to the exemplary embodiment of the present invention.

FIG. 15 is a block diagram showing a functional configuration example of the information processing apparatus 10 according to this exemplary embodiment. As shown in FIG. 15, the information processing apparatus 10 includes a workflow storage unit 21, a step reading unit 22, a branch display control unit 23, a branch destination determination unit 24, and a processing display control unit 25.

The workflow storage unit 21 stores the workflow. The workflow storage unit 21 may store the workflow as, for example, structured data. The workflow includes a plurality of steps. The workflow storage unit 21 may store a plurality of steps as, for example, data of elements constituting structured data of the workflow. Further, the workflow step includes a branch step and a processing step as described above.

Among the steps, for the processing step, information regarding processing (hereinafter referred to as "processing information") is stored. Here, the processing information includes a processing name and the like. The processing name is the name of the processing, and includes, for example, "noise removal processing" and "annotation processing".

Further, for the branch step, information regarding branching (hereinafter referred to as "branch information") is stored. Here, the branch information includes a branch name, a branch destination name, the number of branch destination steps, branch block information, and the like. The branch name is the name of a branch, and includes, for example, a "data type branch" and a "billing amount branch". The branch destination name is the name of a branch destination, and includes, for example, "fax data" and a "billing amount of X yen or more". The number of branch destination steps is the number of steps between the branch step and the step at the confluence of the branches (excluding the branch step and the step at the confluence). As described above, the number of branch destination steps may be the minimum number of steps and the maximum number of steps at the branch destination. The branch block information is information regarding a branch block, and is, for example, processing information of a branch destination in the branch block and the processing step for each branch destination.

The step reading unit 22 reads a step from the workflow stored in the workflow storage unit 21. Further, the step reading unit 22 determines whether the read step is a branch step or a processing step. In a case where the step reading unit 22 determines that the read step is a branch step, the step reading unit 22 acquires branch information from the workflow storage unit 21 and calls the branch display control unit 23 with the branch information as an argument. In a case where the step reading unit 22 determines that the read step is a processing step, the step reading unit 22 acquires processing information from the workflow storage unit 21 and calls the processing display control unit 25 with the processing information as an argument.

In the case where the branch display control unit 23 is called from the step reading unit 22, the branch display control unit 23 controls the display device 15 to display the branch icon, the branch name, and the number of branch destination steps. Here, the branch icon can be distinguished from the processing icon, thereby indicating that the branch destination is not determined before the branch destination is determined and the branch icon is replaced with the processing icon. Further, the branch name and the number of branch destination steps may be acquired from the branch information passed as an argument from the step reading unit 22. In this exemplary embodiment, as an example of performing control such that the first display element representing the branch in the workflow is displayed in a mode indicating that the branch destination of the branch is not determined, the processing of the branch display control unit 23 is performed. Further, the processing performed by the branch display control unit 23 may be regarded as an example of performing control such that the display elements representing the steps in the workflow are displayed in a row in a more generalized manner.

Further, in a case where the branch display control unit 23 displays the branch icon, the branch display control unit 23 calls the branch destination determination unit 24 with the branch information as an argument.

In the case where the branch destination determination unit 24 is called from the branch display control unit 23, the branch destination determination unit 24 determines the branch destination of the branch indicated by the branch icon based on the branch destination name included in the branch information. The branch destination determination unit 24 may determine the branch destination according to the operation of the user. As such a method of determining a branch destination, for example, there is a method of determining the branch destination depending on whether the user selects document data or fax data. Further, the branch destination determination unit 24 may determine the branch destination based on the result of specific processing that does not require an operation of the user. As such a method of determining a branch destination, for example, there is a method of extracting a billing amount from data and determining the branch destination depending on whether the billing amount is X yen or more or less than X yen.

Further, in a case where the branch destination determination unit 24 determines the branch destination, the branch destination determination unit 24 calls the processing display control unit 25 with information on the determined branch destination and branch information as arguments.

In the case where the processing display control unit 25 is called from the step reading unit 22, the processing display control unit 25 controls the display device 15 to display the processing icon and the processing name. Here, the processing name may be acquired from the processing information passed as an argument from the step reading unit 22.

Further, in the case where the processing display control unit 25 is called from the branch destination determination unit 24, the processing display control unit 25 determines whether the processing step exists in the portion in the branch block of the branch destination determined by the branch destination determination unit 24. In a case where determination is made that the processing step exists, the processing display control unit 25 controls the display device 15 to display the processing icon, the processing name, and the branch destination name. Here, the processing icon represents a processing step at the branch destination determined by the branch destination determination unit 24. Further, the processing name and the branch destination name may be acquired from the branch information passed as an argument from the branch destination determination unit 24. In a case where determination is made that the processing step does not exist, the processing display control unit 25 controls the display device 15 to display the skip icon and the branch destination name. Here, the skip icon represents that there is no processing step at the branch destination determined by the branch destination determination unit 24. Further, the branch destination name may be acquired from the branch information passed as an argument from the branch destination determination unit 24. In this exemplary embodiment, in a case where the branch destination of the branch is determined as one branch destination, as an example of performing control such that the second display element representing the step of one branch destination in the workflow is displayed instead of the first display element, the processing of the processing display control unit 25 is performed. Further, the processing performed by the processing display control unit 25 may be regarded as an example of performing control such that the display elements representing the steps in the workflow are displayed in a row in a more generalized manner.

Operation of Information Processing Apparatus

Figure 16:
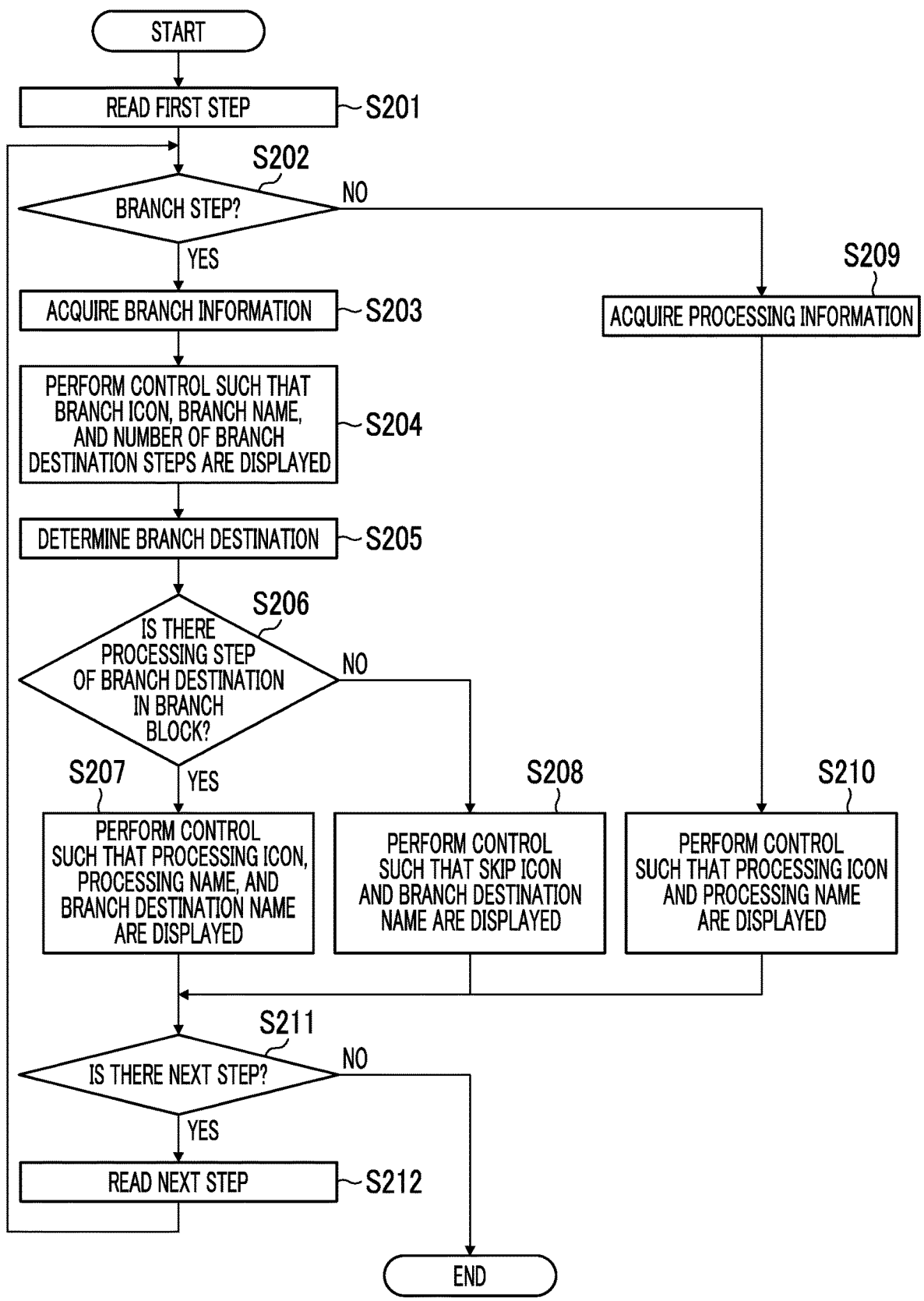
FIG. 16 is a flowchart showing an operation example of the information processing apparatus according to the exemplary embodiment of the present invention.

FIG. 16 is a flowchart showing an operation example of the information processing apparatus 10 according to this exemplary embodiment.

As shown in FIG. 16, in the information processing apparatus 10, first, the step reading unit 22 reads the first step from the workflow stored in the workflow storage unit 21 (Step S201).

Next, the step reading unit 22 determines whether the step read in Step S201 is a branch step (Step S202).

In a case where determination is made in Step S202 that the step read in Step S201 is a branch step, the step reading unit 22 acquires branch information from the workflow storage unit 21 (Step S203).

Next, the branch display control unit 23 controls the display device 15 to display the branch icon, the branch name, and the number of branch destination steps (Step S204). At that time, the branch display control unit 23 may acquire the branch name and the number of branch destination steps from the branch information acquired in Step S203. Further, in a case where the branch destination is determined by the operation of the user, the branch display control unit 23 may display an icon (for example, selection instruction icon 371, 471) prompting the operation of the user.

With the branch icon displayed on the display device 15 in Step S204, the branch destination determination unit 24 determines the branch destination (Step S205). Here, the branch destination determination unit 24 may determine the branch destination according to the operation of the user, or may determine the branch destination based on the result of the processing that does not depend on the operation of the user.

As a result, the processing display control unit 25 determines whether there is a processing step of the branch destination determined in Step S205 in the branch block including the branch step read in Step S201 (Step S206). At that time, the processing display control unit 25 may make this determination based on the branch block information included in the branch information acquired in Step S203.

In a case where determination is made in Step S206 that there is a processing step of the branch destination in the branch block, the processing display control unit 25 controls the display device 15 to display the processing icon, the processing name, and the branch destination name (Step S207). At that time, the processing display control unit 25 may acquire the processing name and the branch destination name from the branch information acquired in Step S203.

In a case where determination is made in Step S206 that there is no processing step of the branch destination in the branch block, the processing display control unit 25 controls the display device 15 to display the skip icon and the branch destination name (Step S208). At that time, the processing display control unit 25 may acquire the branch destination name from the branch information acquired in Step S203.

In a case where determination is made in Step S202 that the step read in Step S201 is a processing step, the step reading unit 22 acquires processing information from the workflow storage unit 21 (Step S209).

Next, the processing display control unit 25 controls the display device 15 to display the processing icon and the processing name (Step S210). At that time, the processing display control unit 25 may acquire the processing name from the processing information acquired in Step S209.

After that, the step reading unit 22 determines whether there is a next step in the workflow stored in the workflow storage unit 21 (Step S211).

In a case where determination is made in Step S211 that there is a next step, the step reading unit 22 reads the next step (Step S212) and proceeds to Step S202. Then, the step reading unit 22 controls the branch display control unit 23, the branch destination determination unit 24, and the processing display control unit 25 such that Steps S202 to S210 are executed with the step read in Step S212 as the processing target.

In a case where determination is made in Step S211 that there is no next step, the step reading unit 22 ends the processing.

Processor

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processing performed by the information processing apparatus 10 in this exemplary embodiment is prepared as, for example, a program such as application software.

That is, the program that realizes this exemplary embodiment can be regarded as a program causing a computer to realize a function of performing control such that display elements representing steps in a workflow are displayed in a row, and a function of performing control such that a first display element representing a branch in the workflow is displayed in a mode indicating that a branch destination of the branch is not determined.

Further, the program that realizes this exemplary embodiment can be provided not only by a communication unit but also by storing the program in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to
      perform control such that display elements representing steps in a workflow are displayed in a row; and
      perform control such that a first display element representing a branch in the workflow is displayed in a mode indicating that a branch destination of the branch is not determined.

2. The information processing apparatus according to claim 1, wherein the processor is configured to:
   perform control such that information regarding steps of a plurality of branch destinations of the branch in the workflow is displayed in association with the first display element.

3. The information processing apparatus according to claim 2,
   wherein the information regarding the steps of the plurality of branch destinations is the number of steps of each branch destination of the plurality of branch destinations.

4. The information processing apparatus according to claim 1, wherein the processor is configured to:
   in a case where the branch destination of the branch is determined as one branch destination, perform control such that a second display element representing a step of the one branch destination in the workflow is displayed instead of the first display element.

5. The information processing apparatus according to claim 4, wherein the processor is configured to:
   perform control such that the second display element and a third display element representing another step of the one branch destination in the workflow are displayed as a group.

6. The information processing apparatus according to claim 4, wherein the processor is configured to:
   determine the branch destination of the branch as the one branch destination based on a result of specific processing that does not require an operation of a user.

7. The information processing apparatus according to claim 6, wherein the processor is configured to:

perform control such that information indicating that the one branch destination has been determined based on the result of the specific processing is displayed in association with the second display element.

8. The information processing apparatus according to claim 4, wherein the processor is configured to:
in a case where there is a problem in determining the branch destination of the branch, output information indicating that the workflow is to be edited.

9. The information processing apparatus according to claim 1, wherein the processor is configured to:
perform control such that a fourth display element representing that an operation of a user is required to determine the branch destination of the branch is displayed in association with the first display element.

10. A non-transitory computer readable medium storing a program causing a computer to realize:
a function of performing control such that display elements representing steps in a workflow are displayed in a row; and
a function of performing control such that a first display element representing a branch in the workflow is displayed in a mode indicating that a branch destination of the branch is not determined.

11. An information processing apparatus comprising:
means for performing control such that display elements representing steps in a workflow are displayed in a row; and
means for performing control such that a first display element representing a branch in the workflow is displayed in a mode indicating that a branch destination of the branch is not determined.

* * * * *